(12) United States Patent
Chen

(10) Patent No.: US 8,671,799 B2
(45) Date of Patent: Mar. 18, 2014

(54) QUICK RELEASE DEVICE FOR A PEDAL

(76) Inventor: Chung-l Chen, Taichung (TW)

( * ) Notice: Subject to any disclaimer, the term of this patent is extended or adjusted under 35 U.S.C. 154(b) by 0 days.

(21) Appl. No.: 13/277,230

(22) Filed: Oct. 20, 2011

(65) Prior Publication Data
US 2012/0034029 A1 Feb. 9, 2012

Related U.S. Application Data

(63) Continuation-in-part of application No. 12/254,005, filed on Oct. 19, 2008, now abandoned.

(51) Int. Cl.
*B62M 3/00* (2006.01)
(52) U.S. Cl.
USPC .......... 74/594.4; 74/594.1; 403/321; 403/325
(58) Field of Classification Search
USPC ................ 403/154, 321, 322.1, 323–325; 74/594.1, 594.4
See application file for complete search history.

(56) References Cited

U.S. PATENT DOCUMENTS

| | | | |
|---|---|---|---|
| 3,000,622 A * | 9/1961 | Hales | 267/64.13 |
| 3,554,585 A * | 1/1971 | Sorenson | 403/105 |
| 5,586,472 A * | 12/1996 | Lin | 74/594.1 |
| 6,568,296 B1 * | 5/2003 | Lin | 74/594.1 |
| 6,585,444 B1 * | 7/2003 | Podbutzky | 403/322.1 |
| 6,647,826 B2 * | 11/2003 | Okajima et al. | 74/594.4 |
| 6,874,387 B2 * | 4/2005 | Vaughn | 74/594.1 |
| 7,080,574 B2 * | 7/2006 | Chang | 74/594.1 |
| 7,228,761 B1 * | 6/2007 | Chen | 74/594.7 |
| 7,490,554 B2 * | 2/2009 | Lynch et al. | 102/275.11 |

* cited by examiner

*Primary Examiner* — Gregory Binda
*Assistant Examiner* — Nahid Amiri

(57) ABSTRACT

A quick release device for a pedal includes a spindle, a connecting unit connected to the spindle, and a quick release mechanism connected to the connecting unit. The spindle has a protrusion extending from one end thereof and an annular groove defined in an outer peripheral thereof. The connecting unit has a receiving hole defined therein, a guiding hole defined in a lateral thereof and communicated with the receiving hole, and a retaining hole defined therein and communicated with the receiving hole. The quick release mechanism includes a rod partially received in the guiding hole and a spring biased against the rod toward the receiving hole. In assembly the protrusion engages with the retaining hole and the rod engages with the annular groove.

3 Claims, 4 Drawing Sheets

QUICK RELEASE DEVICE FOR A PEDAL

CROSS-REFERENCE TO RELATED APPLICATION

This application is a Continuation-In-Part application of Ser. No. 12/254,005, filed May 19, 2011, and entitled "QUICK RELEASE DEVICE FOR A PEDAL", now abandoned.

BACKGROUND OF THE INVENTION

1. Field of the Invention

The present invention relates to a quick release device, and more particularly to a quick release device for a pedal.

2. Description of Related Art

Bicycle pedals are typically connected to the crank by screw bolts and nuts. This connecting method does not permit the rider to quickly and easily detach the pedal from the crank. A conventional quick release device in accordance with the prior art comprises a fixing threaded sleeve screwed on the rotation shaft of the pedal and a crank arm formed with locking recess for locking and fixing the fixing threaded sleeve. The crank arm of the conventional quick release device is needed to machine the locking recess, and therefore the conventional quick release device does not fit all the crank arms on the market. Moreover, the connection between the crank arm and the threaded sleeve will loosen after the long time riding. That is dangerous for rider when the pedal is detached from the crank arm.

The present invention has arisen to mitigate and/or obviate the disadvantages of the conventional quick release device.

SUMMARY OF THE INVENTION

The main objective of the present invention is to provide an improved quick release device, and more particular to a quick release device for a pedal, which permits the pedal to be assembled with or detached from the crank easily and quickly.

To achieve the objective, the quick release device for a pedal in accordance with the present invention includes a spindle, a connecting unit connected to the spindle, and a quick release mechanism connected to the connecting unit. The spindle has a protrusion extending from one end thereof and an annular groove defined in an outer peripheral thereof The connecting unit has a receiving hole defined therein for partially receiving the spindle and a guiding hole defined in a lateral thereof and communicated with the receiving hole. The connecting unit has a retaining hole defined therein and communicated with the receiving hole. The quick release mechanism includes a rod partially received in the guiding hole and a spring biased against the rod toward the receiving hole. In assembly the protrusion engages with the retaining hole and the rod engages with the annular groove. When pulling the rod, the rod disengages with the annular groove. Therefore, the spindle is free to be detached from the connecting unit. Furthermore, the spindle further has a first incline surface being adjacent to one side of the annular groove. The connecting unit further has a second incline surface being formed between the receiving hole and the retaining hole.

Further benefits and advantages of the present invention will become apparent after a careful reading of the detailed description with appropriate reference to the accompanying drawings.

DETAILED DESCRIPTION OF THE INVENTION

Figure 1:
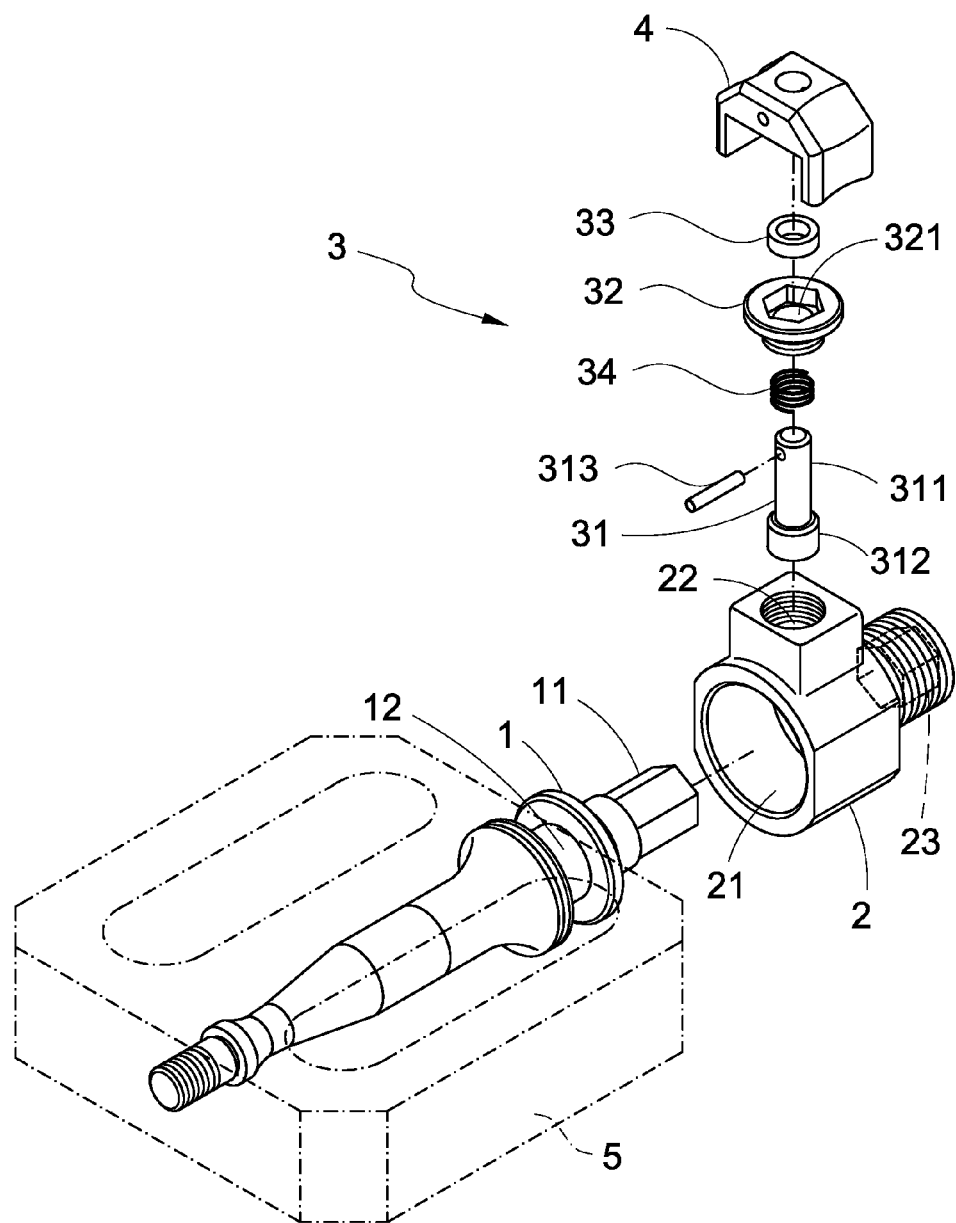
FIG. 1 is an exploded perspective view of a quick release device for a pedal in accordance with the present invention.
Figure 2:
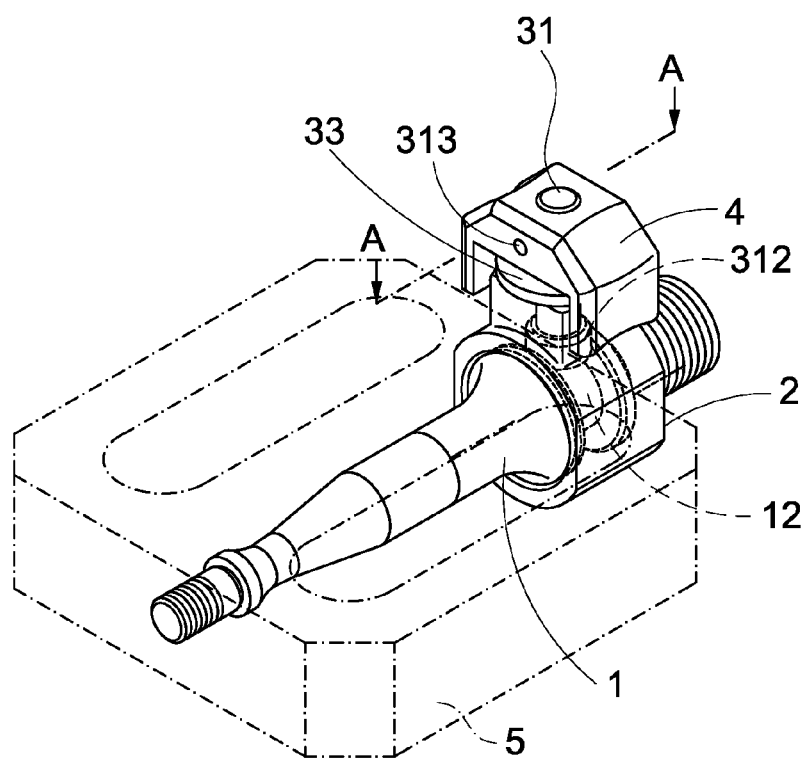
FIG. 2 is an assembled perspective view of the quick release device in FIG. 1.

Referring to the drawings and initially to FIGS. 1-2, a quick release device for a pedal in accordance with the present invention comprises a spindle 1, a connecting unit 2 connected to the spindle 1, a quick release mechanism 3 partially received in the connecting unit 2, and a housing 4 connected to the quick release mechanism 3.

One end of the spindle 1 is formed with a threaded portion (not numbered) for adapting to be mounted to a pedal 5. The spindle 1 has a protrusion 11 coaxially extending from the other end thereof The protrusion 11 is in a shaped of polygon for assembling with the connecting unit 2. The spindle 1 has an annular groove 12 defined in an outer peripheral thereof and being adjacent to the protrusion 11. The connecting unit 2 has a receiving hole 21 defined therein for partially receiving the spindle 1. The connecting unit 2 has a guiding hole 22 defined in a lateral thereof and communicated with the receiving hole 21 for partially receiving the quick release mechanism 3. The guiding hole 22 is perpendicular to the receiving hole 21 and corresponds to the annular groove 12 in the spindle 1 when in assembly.

The connecting unit 2 has a retaining hole 23 defined therein and communicated with the receiving hole 21. The retaining hole 23 is coaxial with the receiving hole 21. The retaining hole 23 is complementary to the protrusion 11 for engaging with the protrusion 11. One end of the connecting unit 2 which is opposite to the receiving hole 21 is formed with a threaded portion (not numbered) for adapting to be mounted to a crank.

The quick release mechanism 3 comprises a rod 31 received in the guiding hole 22, a spring 34 connected to the rod 31, a fastener 32 screwed to the guiding hole 22. The rod 31 has a shank portion 311 formed therein and a head portion 312 extended from one end thereof A diameter of the head portion 312 is greater than that of the shank portion 311. The spring 34 is sleeved on the shank portion 311. One end of the spring 34 is fixed to the fastener 32 and the other end of the spring 34 is abutted to the head portion 312 such that biasing against the rod 31 toward the receiving hole 21. The diameter of the head portion 312 is substantially equal to a width of the annular groove 12 for securely engaging the head portion 312 with the annular groove 12. The fastener 32 has a through hole 321 defined therein for passing the shank portion 311. The fastener 32 has a polygon hole (not numbered) defined therein and coaxially communicated with through hole 321. The polygon hole is provided to be inserted by a tool for screwing the fastener 32. The quick release mechanism 3 further comprises a ring 33 received in the polygon hole. The ring 33 is made of soft materials and is lubricated. The ring 33 is sleeved on the shank portion 311 for lubricating and guiding. The housing 4 covers the quick release mechanism 3 for keeping the quick release mechanism 3 from dust and water. The quick release mechanism 3 further comprises a pin 313 passing through the housing 4 and the shank potion 311 such that the rod 31 moves with the housing 4 along an axis of the guiding hole 22 when pulling the housing 4.

Figure 3:
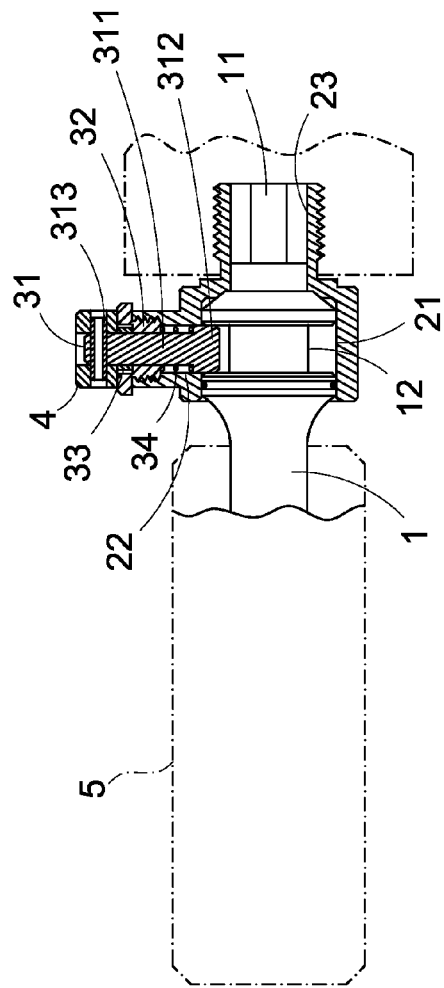
FIG. 3 is a cross-sectional view of the quick release device taken along line A-A in FIG. 2.

Referring to FIG. 3, in assembly, the spindle 1 is inserted into the receiving hole 21. The protrusion 11 engages with the retaining hole 23 such that the spindle 1 does not rotate relative to the connecting unit 2. In the meantime, the head portion 312 of the rod 31 engages with the annular groove 12 in the spindle 1, therefore the spindle 1 is firmly secured with the connecting unit 2. The rod 31 is subjected to a spring force to keep engaging with the annular groove 12. Furthermore, the annular groove 12 is provided to engage with the rod 31 at any angle to enhance flexibility.

Figure 4:
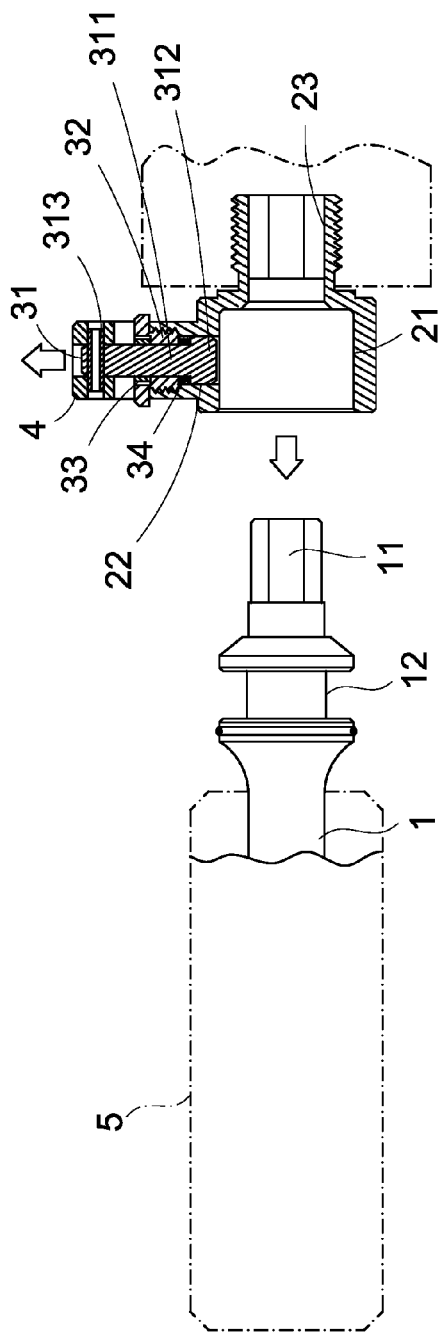
FIG. 4 is an operational cross-sectional view of the quick release device in accordance with the present invention, showing the spindle is detached from the connecting unit.

Referring to FIG. 4, when pulling the housing 4, the rod 31 moves with the housing 4. In the meantime, the head portion 312 disengages with the annular groove 12. The spindle 1 together with the pedal 5 is free to be detached from the connecting unit 2.

Figure 5:
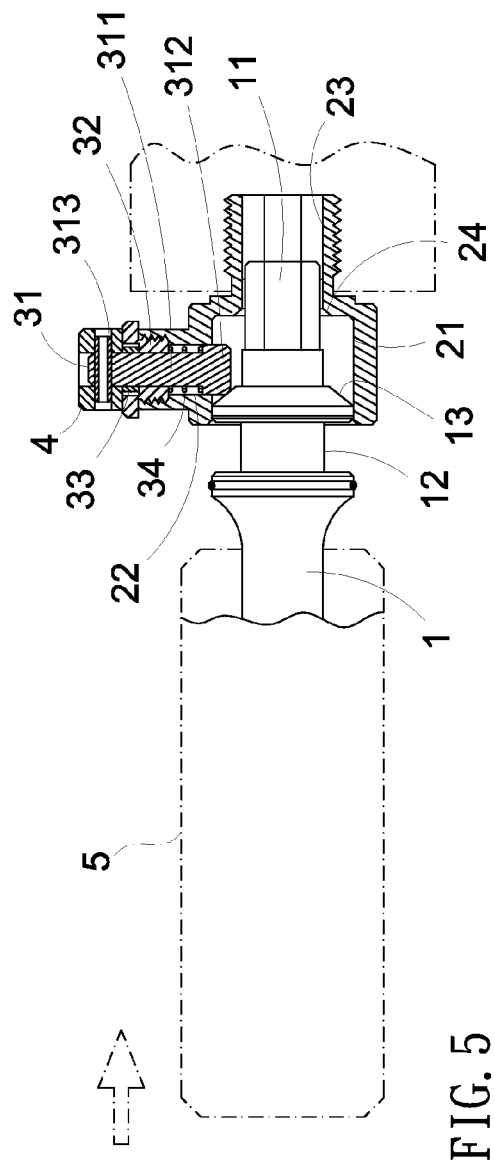
FIG. 5 is a view similar to FIG. 4 of the quick release device, showing the spindle is being inserted into the connecting unit.
Figure 6:
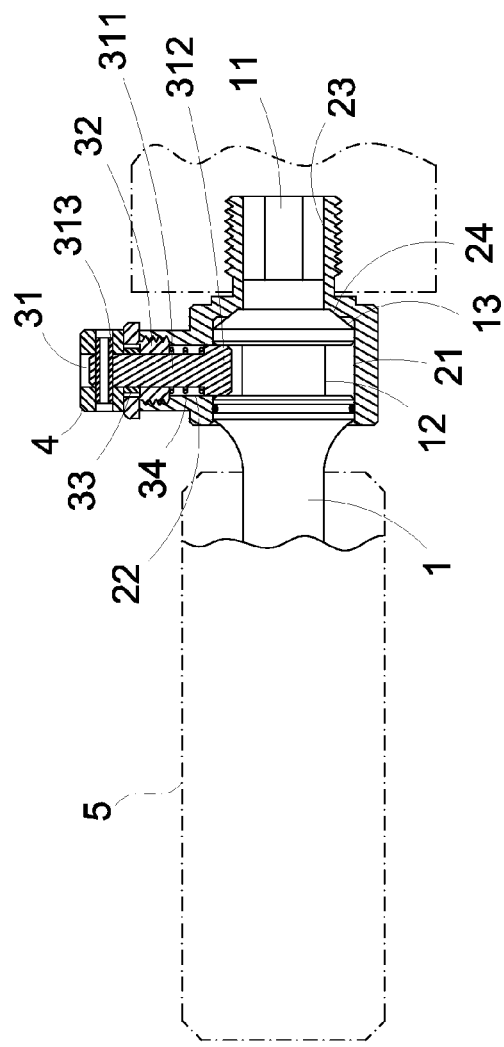
FIG. 6 is a view similar to FIG. 5 of the quick release device, showing the spindle is engaged with the connecting unit.

Referring to FIG. 5-6, the spindle 1 further has a first incline surface 13. The incline surface 13 is adjacent to one side of the annular groove 12. When a user wants to connect the spindle 1 to the connecting unit 2, the user inserts the protrusion 11 into the retaining hole 23 until the protrusion 11 partially engages with the retaining hole 23 and the head portion 312 abuts against the first incline surface 13, thereafter the user pushes the pedal 5 forcefully and the head portion 312 of the rod 31 is compressed by the first incline surface 13 and moves up axially and smoothly along the first incline surface 13. After the first incline surface 13 goes through the head portion 312, the head portion 312 of the rod 31 moves down axially via the elasticity of the spring 34 and engages with the annular groove 12 in the spindle 1 so that the spindle 1 is secured with the connecting unit 2. Furthermore, the connecting unit 2 has a second incline surface 24. The second incline surface 24 is formed between the receiving hole 21 and the retaining hole 23. When the spindle 1 is secured with the connecting unit 2, the second incline surface 24 of the connecting unit 2 abuts against the first incline surface 13 of the spindle 1 so that the spindle 1 is secured with the connecting unit 2 firmly and stably. Under this arrangement, when the user wants to connect the spindle 1 to the connecting unit 2, the user pushes the pedal 5 with one hand easily and quickly rather than holding the pedal 5 with one hand and pulling the housing 4 with another hand inconveniently.

Although the invention has been explained in relation to its preferred embodiment, it is to be understood that many other possible modifications and variations can be made without departing from the spirit and scope of the invention as hereinafter claimed.

What is claimed is:

1. A pedal comprising:
a pedal body;
a spindle rotatably inserted in the pedal body and formed outside the pedal body with an engaging portion and a protrusion at a distal end; the engaging portion having an annular groove defined in an outer peripheral thereof and a tapered section formed between the annular groove and the protrusion and gradually narrower toward the protrusion;
a connecting unit provided to be mounted to a crank and defining a receiving hole at one end for receiving the engaging portion of the spindle, a retaining hole at the other end and in communication with the receiving hole for receiving the protrusion of the spindle, and a guiding hole defined in a side thereof and communicated with the receiving hole; and
a quick release mechanism including a spring-loaded latch member that is substantially received in the guiding hole of the connecting unit and is configured to be biased in a manner that the latch member is normally having its inner end engaged in the annular groove of the spindle for locking the spindle, and the quick release mechanism being operable for withdrawal of the inner end of the latch member off the annular groove of the spindle in order to release the spindle from the connecting unit.

2. The pedal as claimed in claim 1, wherein the retaining hole of the connecting unit is polygonal in cross section, and the protrusion of the spindle is shaped to fit in the retaining hole of the connecting unit.

3. The pedal as claimed in claim 1, wherein the latch member of the quick release mechanism is a rod in shape and has a head portion served as said inner end of the latch member and a shank portion extending from the head portion; and the quick release mechanism further includes:
a fastener screwed in the guiding hole of the connecting unit and defining a through hole through which the shank portion of the latch member passes;
a spring interposed between the head portion of the latch member and the fastener so as to urge the head portion of the latch member into the annular groove of the spindle or the receiving hole of the connecting unit; and
a housing disposed outside the connecting unit and secured to the shank portion of the latch member such that pulling the housing outward displaces the spindle to have its head portion withdrawn from the annular groove of the spindle or the receiving hole of the connecting unit.

* * * * *